United States Patent

Weber

[15] 3,637,223
[45] Jan. 25, 1972

[54] METAL-TO-METAL SEAL
[72] Inventor: Ronald A. Weber, Ojai, Calif.
[73] Assignee: Esso Production Research Company
[22] Filed: June 12, 1970
[21] Appl. No.: 49,212

[52] U.S. Cl..........................277/205, 277/236, 285/335, 285/DIG. 17
[51] Int. Cl..........................................F16j 15/08
[58] Field of Search..............277/205, 168, 206, 206.1, 236, 277/79; 285/106, 336, DIG. 17, 335

[56] References Cited

UNITED STATES PATENTS

| 2,521,647 | 9/1950 | Operhall | 277/205 X |
|---|---|---|---|
| 3,326,560 | 6/1967 | Trbovich | 277/205 X |
| 1,153,824 | 9/1915 | Pierce | 285/106 X |
| 2,626,839 | 1/1953 | Creson et al. | 277/205 X |
| 739,859 | 9/1903 | Halsey | 277/205 X |
| 2,126,505 | 8/1938 | Risser | 285/106 |
| 1,721,325 | 7/1929 | Wilson | 277/205 X |
| 1,866,160 | 7/1932 | Griswold, Jr. | 277/206 |
| 1,825,962 | 10/1931 | Laird | 277/168 X |

FOREIGN PATENTS OR APPLICATIONS

| 162,868 | 5/1921 | Great Britain | 277/205 |

*Primary Examiner*—Edward J. Earls
*Attorney*—Thomas B. McCulloch, Melvin F. Fincke, John S. Schneider, Sylvester W. Brock, Jr., Kurt S. Myers and Timothy L. Burgess

[57] ABSTRACT

A V-shaped deformable metallic seal is retained in a groove formed in a flat face on one metallic joining section and effects a seal against a flat face on an opposing metallic joining section when these sections are brought together by suitable means.

10 Claims, 5 Drawing Figures

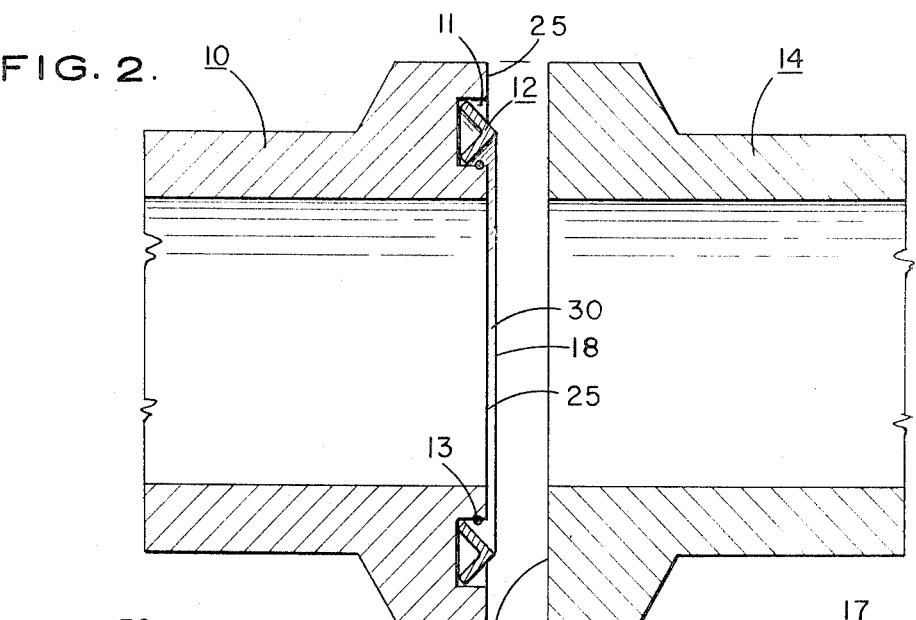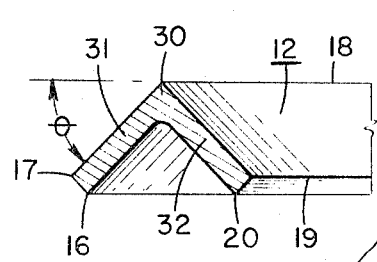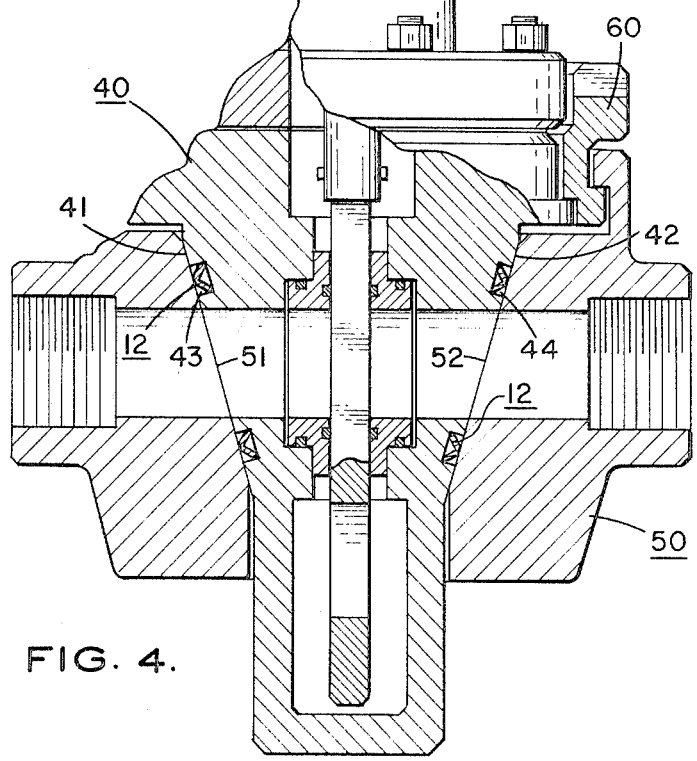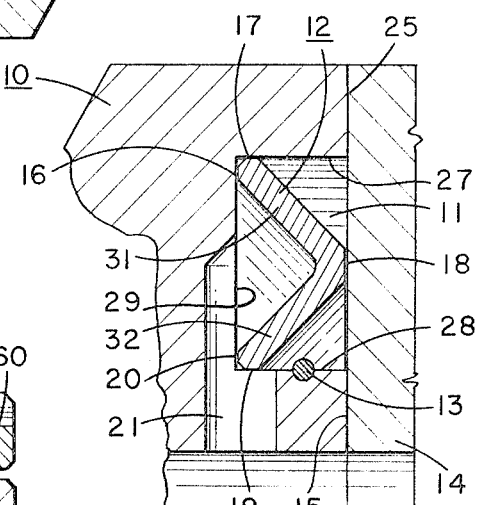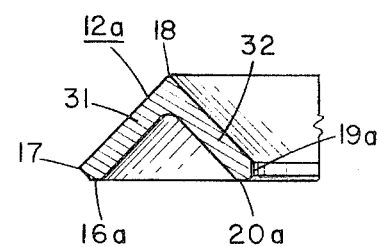

METAL-TO-METAL SEAL

The present invention relates to a V-shaped metallic seal gasket to be used in joining metallic sections of fluid pressure systems to facilitate metal-to-metal sealing, particularly when such connections are subjected to severe service for an extended period such as occurs in subaqueous oil and gas well operations.

SUMMARY OF THE INVENTION

The seal element comprises a deformable metallic seal member having a V-shaped cross section and preferably continuous and circular or ring-shaped. The invention also contemplates use of the seal element in a connection for joining metallic sections. Such connection comprises a first section having a flat face provided with a groove, said groove having sidewalls perpendicular to the base wall thereof; a second section having a flat face to be joined to said first section; a deformable metallic seal element having a V-shaped cross section arranged in said groove, the vertex of the V thereof extending above the flat face of said first section prior to joining said sections together and the ends of the sides or legs of the V terminating at the junctions of the sidewalls and base wall of said groove, the end of one leg of the V contacting one sidewall and the base wall of said groove and the other leg of the V contacting the other sidewall and the base wall of said groove; said seal element deforming at the vertex and at the points of contact of the edges of the ends of the legs of said seal element when the flat faces of said first and second sections are brought and held together. Fluid pressure acts on the inside of one (seal) leg of the V to effect pressure energized seals at the contact edge of that leg and the sidewall of the groove and at the contact edge at the vertex of the V and the flat face of the second section. The other contact surfaces function as mechanical backups. In order to concentrate deformation and coining at the sealing surfaces the edges of each leg of the V which contact the base of the groove and the edge of the other (support) leg of the V which contacts the sidewall of the groove may be beveled.

BRIEF DESCRIPTION OF THE DRAWINGS

FIG. 1 illustrates one embodiment of the seal element of the invention;

FIG. 2 illustrates use of the seal element in connection of two pipe sections;

FIG. 3 illustrates the manner in which the seal element functions when the two pipe sections of FIG. 1 are brought together;

FIG. 4 illustrates use of the seal element in another type structure; and

FIG. 5 illustrates another embodiment of the seal element.

DESCRIPTION OF THE PREFERRED EMBODIMENTS

In FIG. 1 there is shown a metal seal element or gasket 12 which has a V-shaped cross section (inverted.) Components of the V include the vertex 30, sides or legs 31 and 32 and contact points or edges 16, 17, 18, 19 and 20. In FIG. 2 there is shown a metal hub 10 connected to or forming a part of a pipe or conduit, not shown, and provided with a smooth flat surface 25 having a groove 11 in which the metal seal element 12 is retained by a suitable ring member 13 which may be a rubber O-ring. A metal hub 14 connected to or forming a part of another pipe or conduit, not shown, and to which hub 10 is to be joined has a flat surface 15 which mates with the flat surface 25 of hub 10 as shown in FIG. 3. Groove 11 is circular and is formed by two sidewalls 27 and 28 perpendicular to a base or bottom wall 29 of the groove. When hubs 10 and 14 are brought together by means not shown, seal element 12 coins, that is, deforms at all points of contact which points are edges 16 and 20 in contact with the base of groove 11, edges 17 and 19 in contact with sidewalls 27 and 28 respectively, and edge 18 in contact with surface 15 of hub 14 as shown in FIG. 3. A fluid passage 21 permits line fluid access to the inside of seal legs 31 and 32 effecting the pressure-energized seal. Alternatively, such fluid access could be provided by an opening or hole formed in leg 32. Line fluid pressure within hubs 10 and 14 acts on the inside surface of the outer leg 31 to effect pressure energized seals at contact surfaces 17 and 18. Contact surfaces 16, 19 and 20 act as mechanical backups. The angle of the V (see FIG. 1) is preferably chosen so as to equalize the pressure load over the length of leg 31 to avoid or minimize any tendency for the edges of the end of leg 31 to move i.e., "crawl" either along side wall 27 or along base wall 29 of groove 11. The angle $\theta$ is, therefore, preferably 45° or in the range between 40° and 50°. However, any greater or lesser angle in which such movement of the edges of the end of leg 31 is substantially avoided would be satisfactory.

The seal gasket 12 is useful in underwater equipment designed for subsea oil and/or gas well operations. Such equipment is described and claimed in copending U.S. Pat. application Ser. No. 855,110 filed Sept. 4, 1969, entitled COMPARTMENTED UNDERWATER EQUIPMENT by Burkhardt et al. As shown in FIG. 4, such equipment includes a body member 40 containing a valve element having tapered or slanted flat opposing sides 41 and 42 inserted in a receptacle 50. Sides 41 and 42 mate with complementary sides 51 and 52, respectively, of receptacle 50. Insertion of body member 40 into receptacle 50 is in effect a wedging operation. A circular groove 43, similar to groove 11 of FIGS. 2 and 3, is formed in surface 41 and a continuous circular sealing member 12 is positioned in the groove. A corresponding circular groove 44 is formed in surface 42 and a continuous sealing member 12 is also positioned in it. The sealing rings shown in FIG. 4 perform in the same manner as the sealing ring shown in FIGS. 2 and 3. In the equipment shown in FIGS. 4, surfaces 41–51 and 42–52 are brought together by a wedging action by operation of a pressure locking ring 60.

The metal or metals of which the seal element is made must be softer than the metal or metals of the surfaces contacted by the seal element to permit deformation and coining of the contact edges of the seal element without damaging the surfaces contacted. Other properties of the metallic seal element, as well as the size of the seal element including the width of its legs, must be such that adequate strength and rigidity are provided. Seal leg 31, however, should have sufficient flexibility to deform slightly under mechanical loading to permit seal edge 18 to accommodate minor intolerances in the mating or abutting surfaces to be sealed such as 15, 25 (FIG. 2) and 42, 52 (FIG. 4). Leg 32 should have sufficient strength to function as a support for leg 31. Suitably the seal element may be made of mild steel where the surfaces contacted by the seal element are made of stainless steel. The seal element may be plated or coated with a thin layer of a preservative and lubricant and sealant such as cadmium or Teflon.

A modified seal element or gasket is shown in FIG. 5. It is the same as the seal element shown in FIG. 1 except the contact backup surfaces or points 16, 19 and 20 have been beveled as indicated at 16a, 19a and 20a, respectively. These surfaces are beveled in order to concentrate coining and deformation at the sealing edges 17 and 18 and obtain improved seals at these points.

The specific embodiment described and illustrated herein are only illustrative. The invention is not limited thereto and many variations will be apparent to those skilled in the art.

Having fully described the apparatus, objects, advantages and operation of my invention I claim:

1. A seal element comprising a deformable continuous metallic gasket having a V-shaped cross section, one leg of said V being a seal leg and the other leg of said V being a support leg, the bottom surface of each leg being perpendicular to the side surfaces thereof and the inner edge of the bottom surfaces of each leg and the outer edge of the bottom surface of said support leg being beveled.

2. A seal element comprising a deformable metallic gasket having a V-shaped cross section, each leg or side of said V extending from a horizontal line through the vertex of the V at the same angle to said line, said angle being in the range between about 40° and 50°, one leg of said V being a seal leg and the other leg of said V being a support leg, the bottom surface of each leg being perpendicular to the side surfaces thereof and the inner edge of the bottom surfaces of each leg and the outer edge of the bottom surface of said support leg being beveled.

3. A sealed connection for joining metal sections comprising:
a first section having a flat face provided with a groove, said groove having sidewalls perpendicular to the base wall of said groove;
a second section having a flat face to be joined to said first section;
a deformable metallic seal element having a V-shaped cross section arranged in said groove, the vertex of the V thereof extending above the flat face of said first section prior to joining said sections together and the ends of the legs of the V terminating at the junctions of the sidewalls and base wall of said groove, the end edges of one leg of the V contacting one sidewall and the base wall of said groove and the end edge of the other leg of the V contacting the other sidewall and the base wall of said groove; and
said seal element deforming at the vertex and at the points of contact of the edges of the ends of said seal element when the flat faces of said first and second sections are brought together.

4. A sealed connection as recited in claim 3 in which the bottom surface of each leg of said V is perpendicular to the side surfaces thereof and the inner edge of the bottom surfaces of each leg and the outer edge of the bottom surface of one leg are beveled.

5. A sealed connection as recited in claim 4 in which the seal element is made of softer metal than the metal of said sections contacted by said seal element.

6. A connection as recited in claim 5 including means for facilitating access of fluid pressure from within said first and second sections to the inner sides of the legs of said V.

7. A connection as recited in claim 6 in which said first and second sections are pipe sections.

8. A connection as recited in claim 7 in which said metallic seal is continuous.

9. A connection as recited in claim 8 in which the legs or sides of the V each extend from a horizontal line through the vertex of the V at the same angle to said line, said angle being in the range between about 40° and 50°.

10. A connection as recited in claim 9 in which the faces of said sections extend in a slanted direction and said sections are joined together by a wedging action.

* * * * *